United States Patent [19]
Carrigan

[11] 3,877,315
[45] Apr. 15, 1975

[54] WHEEL BALANCER

[75] Inventor: Tracy Carrigan, Lansing, Mich.

[73] Assignee: FMC Corporation, San Jose, Calif.

[22] Filed: June 15, 1973

[21] Appl. No.: 370,270

[52] U.S. Cl. ................................ 73/459; 73/487
[51] Int. Cl. ..................... G01m 1/12; G01m 1/14
[58] Field of Search ....... 73/459, 66, 480, 483, 484, 73/485, 487

[56] References Cited
UNITED STATES PATENTS

| | | | |
|---|---|---|---|
| 2,601,120 | 6/1952 | Lyman | 73/480 X |
| 2,718,781 | 9/1955 | Kiebert | 73/484 |
| 3,164,996 | 1/1965 | Carrigan | 73/483 |
| 3,595,068 | 7/1971 | Skidmore | 73/487 X |
| 3,760,633 | 9/1973 | Skidmore | 73/66 |

FOREIGN PATENTS OR APPLICATIONS

| | | | |
|---|---|---|---|
| 898,021 | 6/1962 | United Kingdom | 73/459 |

Primary Examiner—James J. Gill
Attorney, Agent, or Firm—A. J. Moore; C. E. Tripp

[57] ABSTRACT

A wheel and tire balancer and method for using the same is disclosed. The balancer includes a balancing head rotatable about the vertical axis of a horizontally oriented ball bearing assembly for determining lateral run-out of a wheel and tire assembly centered on the balancing head in a generally horizontal position. The balancer further includes a pivot bearing for allowing the balancing head with the wheel and tire assembly to be selectively supported on the pivot bearing to tilt from its normal horizontal position thereby indicating the static imbalance of the wheel and tire assembly. Imbalance compensating weights are added to the wheel rim in proportion to the linear amount of lateral run-out to approximate dynamic and static balancing of the wheel and tire assembly within tolerances more effective than static balancing alone.

7 Claims, 8 Drawing Figures

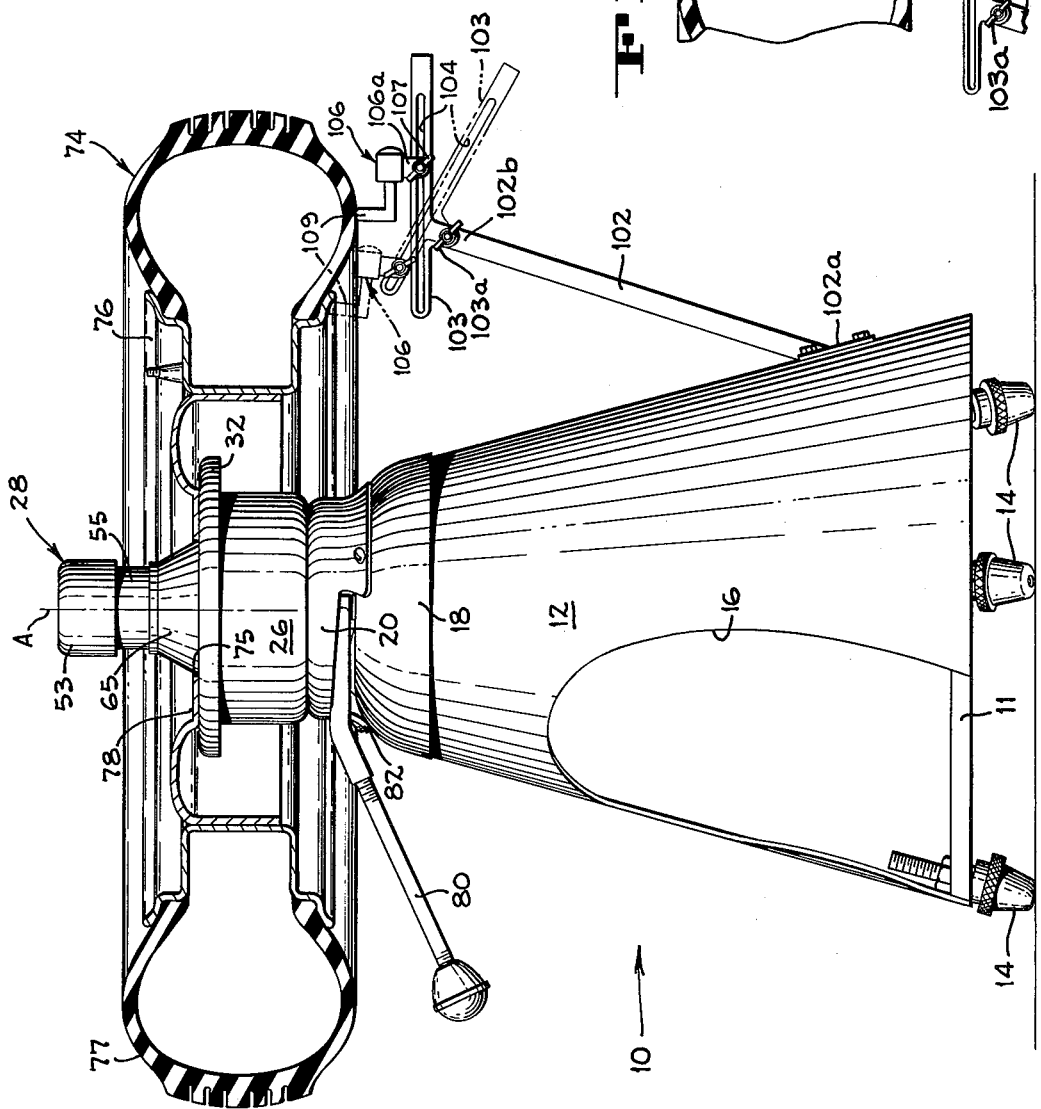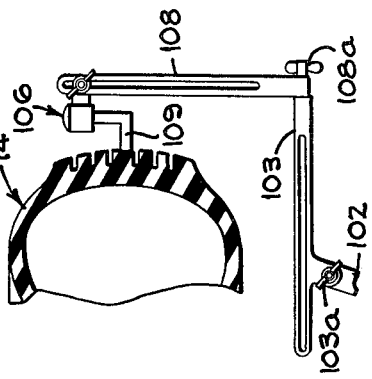

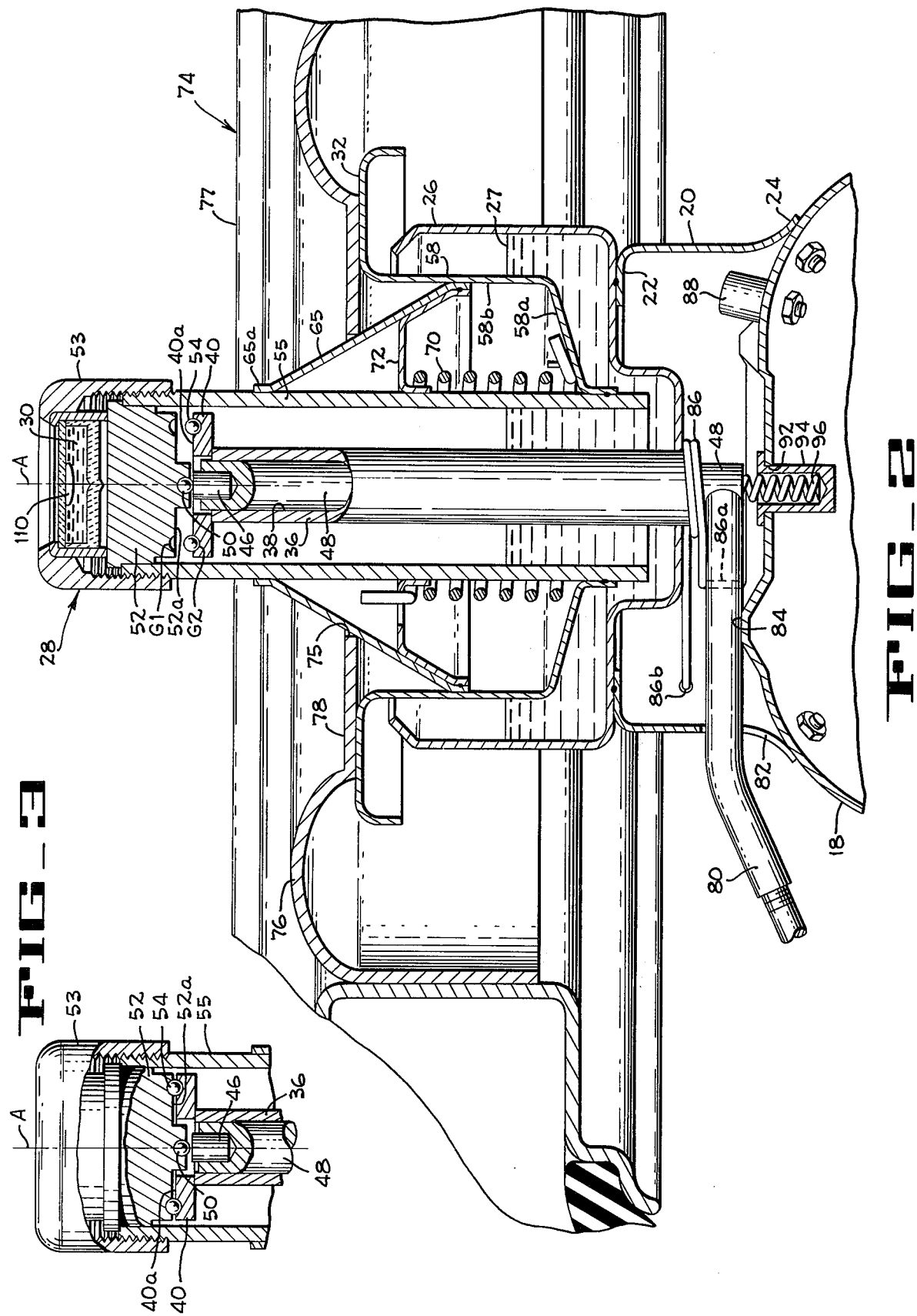

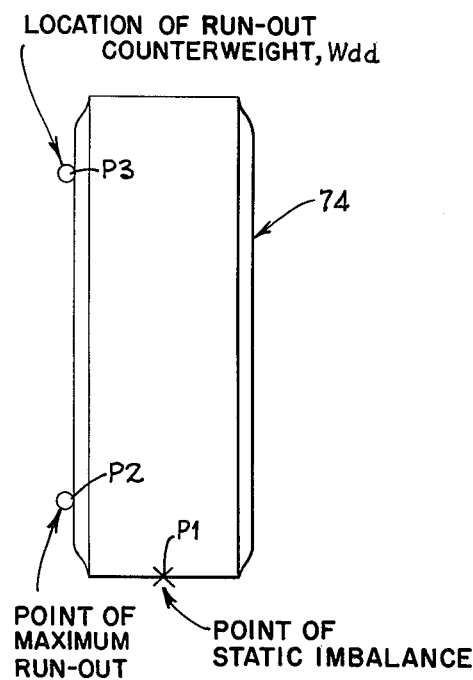
FIG_4
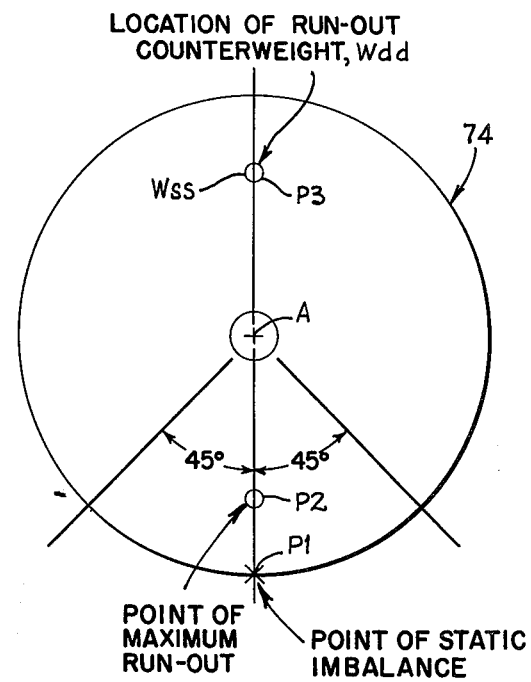
FIG_5
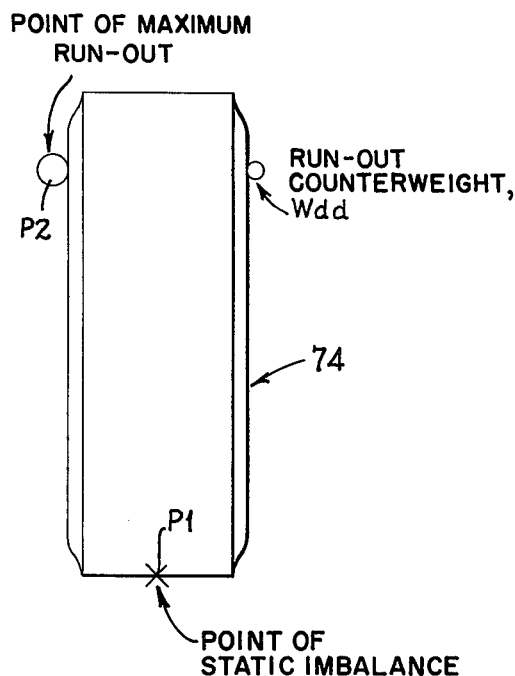
FIG_6
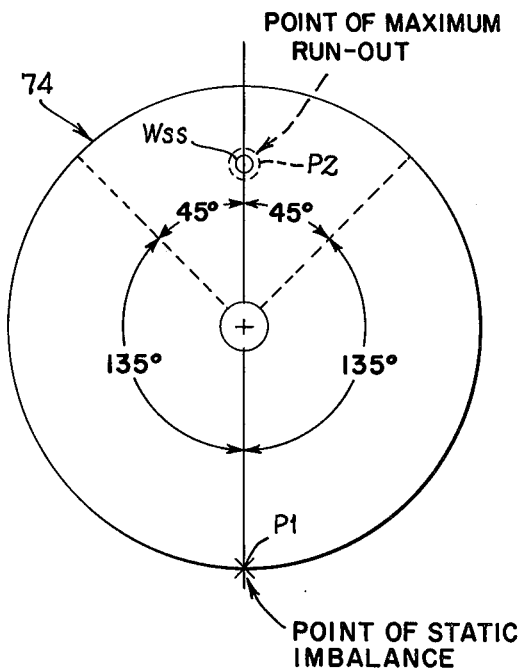
FIG_7

WHEEL BALANCER

BACKGROUND OF THE INVENTION

1. Field of the Invention

This invention relates to balancers and to a method of using a static bubble type balancer to approximately balance a wheel and tire assembly or the like both statically and dynamically within tolerances more favorable than static balancing alone.

2. Description of the Prior Art

A balancer disclosed in Slemmons U.S. Pat. No. 3,289,483 includes a balancing head which is spun on a self aligning bearing to cause the wheel axis to gyrate and give an indication of dynamic imbalance, and also uses a single ball for determining static imbalance by means of a bubble. Skidmore U.S. Pat. No. 3,595,068 discloses a method of balancing a tire by first measuring the axial or lateral offset of the tire relative to the wheel rim and thereafter mounting the wheel and tire assembly on a static balancer for determining static imbalance. Carrigan U.S. Pat. Nos. 3,280,640 and 3,164,996 disclose bubble type static balancers which are similar to the balancer herein disclosed but do not include provisions for detecting and measuring dynamic imbalance.

An apparently unpatented and unpublished method, known in the industry as the Rudham method, has been used for balancing wheel and tire assemblies when the axis of the wheel and tire assembly is horizontally disposed, not vertically disposed as in the bubble type balancers mentioned above and disclosed herein. The Rudham procedure is understood to be as follows:

1. Indicate the lateral run-out by turning the tire and marking the "high" point on the side of the tire. Note the amount of run-out in inches.
2. Allow the tire assembly to pivot about the horizontal axis and come to rest with the heavy spot at the bottom.
3. Mark the location of the 12:00 o'clock position, i.e., at the top of the tire, for the application of the static compensating weight.
4. For every 1/16 inch of lateral run-out 1 ounce of static weight is applied either on the opposite side of the tire within plus or minus 45° of the maximum run-out; or, the static weight is applied 135° or more from the maximum lateral run-out mark on the same side of the tire.
5. If the amount of static compensating weight required to prevent the heavy part of the tire to come to rest at the bottom of the tire is less than the computed amount needed to achieve dynamic balance, then all of the computed dynamic compensating weight is added on the proper side of the tire. If more static compensating weight is required to prevent the heavy spot of the tire from coming to rest at the bottom than is needed for correcting the force coupled or dynamic imbalance, then the static weight is split and weights are placed on opposite sides of the wheel leaving the dynamic compensating weights of 1 ounce per 1/16th of an inch of run-out weight to offset the assumed dynamic correction needed.

SUMMARY OF THE INVENTION

The wheel balancer of the present invention is a modified static balancer, better known as a bubble balancer, which when operated in accordance with the method of the present invention will provide a wheel and tire assembly which is not only statically balanced but is also dynamically balanced to an acceptable degree. The total dynamic and static balance of the wheel and tire assembly is superior to a wheel and tire assembly that is only statically balanced even though the compensation for the dynamic imbalance is arrived at by measuring the maximum lateral run-out and converting the linear amount of run-out to proportional compensating run-out weights.

The wheel balancer includes the usual centrally disposed pivot fulcrum or ball for supporting the wheel and tire assembly in a generally horizontal plane allowing the heavy side of the tire to drop thereby indicating the position and amount of static imbalance. The balancer is also provided with a horizontally disposed ball bearing which may be selectively positioned to support the balancing head and lug flange of the wheel and tire assembly in a horizontal plane for slow rotation about a vertical axis while the lateral run-out is being measured in fractions of an inch.

When using the wheel balancer, a wheel and tire assembly is disposed on the balancing head in a horizontal position, which head is then raised to lift it out of contact with the ball bearing elements on the support and to pivot the balancing head on a single, centrally located bearing or pivot. The tire is marked at the location where compensating weights may be added to correct the static imbalance. The balancing head is then lowered onto the horizontally disposed ball bearing assembly and the head and horizontally disposed wheel and tire assembly are slowly rotated by hand while a lateral run-out gauge, attached to the balancer, is used to measure the axial or lateral run-out of the wheel and tire mounted thereon.

The dynamic imbalance is determined by marking the high spot, or point of maximum lateral run-out, on one side of the tire, and the run-out is then measured in inches. The compensating weight to be applied to the wheel rim of the average wheel and tire assembly is determined at the rate of a predetermined number of ounces per unit of run-out length (e.g., 1 ounce per 1/16th inch of lateral run-out). The run-out compensating weight, for example, 2 ounces, is applied to the wheel rim according to the method of the present invention as follows. If the static imbalance is within 45° of the point of maximum run-out, then the predetermined compensating weight, also called the run-out weight, is applied to the wheel rim at a point diametrically opposite the point of maximum run-out on the same side of the tire as the measured run-out or high spot.

If the point of static imbalance is not within the range of 45°, but is more than 135° from the point of maximum run-out, then the predetermined run-out weight (2 ounces) is placed axially opposite the point of maximum run-out, i.e., on the opposite side of the tire. However, if the weight (for example 3 ounces) required to compensate for static imbalance is greater than the predetermined runout weight (2 ounces) then the difference between these two weights (1 ounce) is split, and 0.5 ounces is placed on each side of the wheel at points diametrically opposite the point of static imbalance.

If the maximum run-out is between 45° and 135° from the point of corrective static weight, placement of the static weights have little affect on the dynamic couple. In these cases weights of equal sizes can be placed 180° from each other but on opposite sides of the wheel, one of these weights being placed opposite the high point of maximum run-out.

It is one object of the present invention to provide an improved bubble type balancer with means for measuring lateral run-out of both the tire and wheel as a unit, the wheel alone or the tire relative to the wheel.

Another object is to provide an improved method of balancing a wheel and tire assembly both statically and dynamically when using a modified static bubble type balancer.

The wheel balancer and method of using the same will be made apparent from the following description having reference to the accompanying drawings.

BRIEF DESCRIPTION OF THE DRAWINGS

FIG. 1 is an elevation of a wheel balancer with the wheel and tire assembly shown in central vertical section, and with a run-out gauge shown in two operative positions for taking lateral run-out of the wheel alone or of the wheel and tire assembly as a unit.

FIG. 1A illustrates an attachment for the wheel balancer for adapting the balancer to take radial run-out.

FIG. 2 is an enlarged elevation in vertical central section of the upper portion of the balancer of FIG. 1 and of a fragment of the wheel and tire assembly mounted on the balancing head thereof, the balancing head parts being shown in position for determining static imbalance of the wheel and tire assembly.

FIG. 3 is an elevation with parts broken away and other parts in vertical central section of a portion of the structure shown in FIG. 2, but illustrating a horizontal bearing of such structure in position for determining dynamic imbalance.

FIGS. 4-7 are operational views illustrating the method of placing compensating weights at proper locations on the wheel rim of a wheel and tire assembly in accordance with the present invention.

DESCRIPTION OF THE PREFERRED EMBODIMENT

A wheel balancer 10 of the present invention is shown in FIG. 1. The balancer 10 includes a stand comprising a base plate 11 secured to a truncated conical body 12. Adjustable leveling feet 14 are threadedly secured to the plate 11 as shown. An opening 16 in the body 12 provides a compartment in which items, such as weights and tools, may be stored. A dish shaped cap 18 secured to the upper end of the body 12 supports a cup-shaped tubular member 20 having the upper end thereof bent inwardly to define a flange 22 (FIG. 2) and having the lower end 24 thereof defining an outwardly flared surface secured to the upper end of the cap 18. A bowl 26 has its base secured to the upper surface of the flange 22. The bowl contains liquid 27 for dampening the oscillations of a balancing head 28 in a manner well known in the art. The head 28 includes a conventional bubble level 30 and a wheel mounting flange 32, mounted for rocking and rotational movement about a vertical axis A. To this end, a outer member or tubular sleeve 36 having a bore 38 is secured in fluid tight engagement to the bowl 26 to extend vertically upward concentric with the vertical axis A. An annular plate 40 is secured to the upper end of the tubular sleeve member 36.

A hardened anvil 46 is mounted on the upper end of a vertically movable central pivot rod or post member 48 to provide a horizontal, planar top surface or pivot fulcrum for pivotal rolling contact with a single ball 50 captively secured to a plug 52 in a cap 53 which is part of the balancing head 28. The plug 52 has a flat, horizontal lower surface 52a located vertically above a flat horizontal upper surface 40a of the plate 40. An annular ball receiving groove G1 in the surface 52a faces a similar annular groove G2 in surface 40a. The grooves G1 and G2 are concentric with the vertical axis A and are identically dimensioned to define a bearing race for receiving a plurality of identical balls which define a horizontally disposed ball bearing 54 when the several parts are positioned as indicated in FIG. 3. When the bearing head is lowered to the FIG. 3 position, the ball bearing 54 supports the balancing head 28 in a horizontal plane for rotation about the vertical axis A.

A sleeve 55 of the balancing head 28 is vertically disposed in surrounding relation with the tubular member 36, and has the cap 53 screwed on its upper end for rigidly securing the plug 52 and the spirit level 30 to the member 55. A wheel support 58, open at each end, has an inwardly and downwardly directed conical wall 58a which terminates in a tubular wall that is rigidly secured to the tubular member 55. The support 58 also includes an upwardly extending tubular wall 58b which is integral with the wheel mounting flange 32. The tubular member 55 and wheel support 58 form a unitary structure that is pivotal about a pivot fulcrum at the point of contact of the ball 50 and the anvil 46.

A wheel centering cone 65 has its upper end 65a slidable about the tubular member 55, and its lower end slidable within the inner periphery of the sleeve wall 58b. A spring 70 is disposed about the member 55 and has the lower end thereof abutting the conical wall 58a. An annular partition 72 secured to the inner surface of the cone 65 and slidably engaged with the outer surface of a tubular member 55, provides an abutting surface engaged by the upper end of the spring 70 so that the cone 65 is constantly urged upwardly toward the spirit level 30.

When a wheel and tire assembly 74 is placed on the balancer, the cone 65 centers the assembly by engaging the central opening 75 of the wheel 76. The weight of the wheel 76 and tire 77 moves the cone 65 downwardly to compress the spring 70 until the wheel lug flange 78 engages the balancer flange 32.

The rod 48 extends through the lower open end of the sleeve 36 and has a handle 80 fixed to its lower end. The handle projects through an opening 82 provided in the member 20. A portion of the handle slidably engages a cam surface 84 formed on the uppermost part of the cap 18 for moving the rod 48 axially in the sleeve 36 to move the rod between a static balancing position wherein the ball 50 is supported on the anvil 46 as indicated in FIG. 2, and a dynamic balancing position wherein the anvil is spaced from the ball 50 and the balancing head 28 is supported by the horizontal ball bearing 54 as shown in FIG. 3. A torsion spring 86 surrounds the lower end of the rod 48 and has one end 86a hooked to the handle and the other end 86b fixed to the member 20. The torsion spring normally maintains the handle against a rubber stop 88 so that the handle engages the lower portion of the cam surface 84 and the anvil 46 is in a lowered position to cause the plug 52 of the balancing head 28 to rest on the ball bearing 54 on the plate 40 in the dynamic balancing position shown in FIG. 3. The rod 48, handle 82, and cam surface 84 cooperate to define lifting means for moving the parts between the positions illustrated in FIGS. 2 and 3.

The upper portion of the cap 18 (FIG. 2) includes an opening 92 concentric with the longitudinal axis of the rod 48. A retainer cup 94 in the opening 92 retains and supports a spring 96 which serves to bias the rod upwardly.

The handle 80 is positioned on the lowermost portion of the cam surface 84 before a wheel and tire assembly is placed on the balancer head 28. At this time, the plug 52 rests on the ball bearing 54 thus rendering the balancing head rotatable about axis A in order to measure the lateral run-out of the tire. It will be noted, that at this time the ball bearing 50 and the anvil 46 are out of contact, and that the ball bearing 50 is retained in a flared hole in the plug 52.

A bracket 102 (FIG. 1) has its lower end 102a secured to the conical body 12 and its upper end 102b connected to an adjustable, normally horizontal bracket 103 by a thumb screw 103a. The bracket 103 includes a horizontally elongated slot 104. A conventional linear measurement or run-out gauge 106 is mounted on the horizontal bracket 103 by means of a thumb screw 107 located in a mounting portion 106a of the gauge. The thumb screw 107 passes through the bracket slot 104 and is secured in any desired position in the slot by tightening the thumb screw thus making it possible to measure the run-out of the wheel rim as indicated in dotted lines or the wheel and tire assembly as indicated in solid lines.

As indicated in FIG. 1A the gauge 106 may also be connected to a vertical attachment arm 108 to measure radial run-out if desired. The arm 108 is pivotally connected to the bracket 103 by a thumb screw 108a.

The lateral run-out gauge includes a feeler arm 109 (FIG. 1) which is movable to obtain and indicate a linear measurement on the indicator scale of the gauge. By rotating the tire through 360° while observing the high spot and low spot readings on the gauge, the lateral runout of the tire is determined in fractions of an inch indicating the linear distance between the low spot and the high spot on one side of the tire. Since any conventional linear measurement gauge may be used to obtain lateral run-out, the gauge will not be described in detail.

In operation, the wheel and tire assembly 74 which comprises the support wheel 76 and a pneumatic tire 77, is mounted on the balancing head 28 so that the inner periphery 75 of the wheel lug flange 78 contacts the centering cone 65 and is centered thereby. The weight of the wheel and tire assembly 74 is effective to center the wheel assembly and to lower the cone against the biasing action of the spring 70 until the lug flange 78 rests on the wheel mounting flange 32.

The handle 80 is then swung so that the handle moves up the inclined cam surface 84 causing the rod 48 to raise the anvil 46 into lifting contact with the single ball 50 and thereby raising the balancing head and wheel and tire assembly 74 until the plug 52 is lifted out of contact with the ball bearing 54. Any static imbalance of the assembly 74 as at point P1 will be indicated by the movement of a bubble 110 in the spirit level 30 away from the centering position in response to the gravitational lowering of one side of the wheel and tire assembly. The extent of static imbalance in the assembly is determined by temporarily placing an appropriate amount of weight on the high portion of the wheel rim until the bubble 110 returns to its centered position. After the amount and location of corrective weight to compensate for static imbalance has been determined by trial and error, this weight Wss (FIGS. 5 and 7) is removed from the wheel rim and a chalk mark is made on the upper surface of the tire side wall near the point where the weight Wss was placed to statically balance the assembly.

Next, the handle 80 is swung so that it moves down the inclined surface 84 causing the rod 48 to lower the anvil until the plug 52 moves into contact with the horizontal ball bearing 54 and the anvil moves away from the anvil 46 as indicated in FIG. 3. The wheel and tire assembly 74 is slowly turned about the axis A causing the plug 52 to rotate with respect to the support 40 on the ball bearing 54.

The lateral run-out gauge 106 (FIG. 1) is used to determine the extent and location of maximum lateral runout of the wheel and tire assembly 74 relative to its lug flange 78. The procedure for determining lateral runout involves turning the assembly at least 360° until the locations of the high spot and "low" spot on the lower-most side wall of the tire are determined. The gauge feeler arm 109 contacts the tire during this time and its vertical movement is read directly from the gauge in fractions of an inch thereby determining the maximum wobble or run-out of the wheel and tire assembly 74. At the time the high spot P2 is located, a chalk mark is made on the tire near the uppermost wheel rim to indicate the location of the same. The reading of the run-out gauge is preferably noted in 1/16th inch increments.

After the lateral run-out distance has been determined by using the techniques herein described or by using some other suitable measuring technique, the run-out compensating weight Wdd is determined. The weight Wdd to be used for dynamic balancing of the assembly depends on the amount of lateral run-out, and also on the tire size. A table, established by trial and error, is consulted to determine the weight Wdd to be used to balance an assembly having a certain amount of lateral run-out. Thus, for example, one ounce of compensating weight Wdd may be used for each 1/16th inch of lateral run-out for most passenger car wheel and tire assemblies.

After determining the location and amount of static and dynamic imbalance as above described and in accordance with the teachings of the present invention, the compensating weights to correct static and dynamic imbalance are placed on the wheel and tire assembly 74 as follows:

The angle between the point of static imbalance P1 on the wheel and tire assembly 74 (FIGS. 4 and 5) and the point of maximum lateral run-out P2 is determined, using the vertical axis A as the apex of the angle formed by radial lines taken to points P1 and P2. If the point of static imbalance P1 is within 45°, clockwise or counterclockwise, of the point of maximum run-out P2, then the compensating weight for the predetermined dynamic imbalance Wdd is placed at a point P3 on the wheel rim 76 located diametrically opposite the point of maximum run-out P2 and on the same side of the tire as the high point or measured run-out as indicated in FIGS. 4 and 5.

If the point of static imbalance P1 is not within 45°, clockwise or counterclockwise, from the point of maximum run-out P2, as indicated in FIGS. 6 and 7, but is more than 135° clockwise or counter-clockwise of the point of maximum run-out, then the predetermined dynamic imbalance compensating weight, or run-out weight, Wdd is placed axially opposite the point of maximum run-out P2 or in other words, on the side of the tire which is opposite the side of the measured lateral run-out.

If the point of static imbalance is within the above mentioned ranges of 45° or more than 135° clockwise or counterclockwise from the point of maximum run-out and the static imbalance weight is more than needed for dynamic correction on the basis of one ounce for each 1/16 inch run-out, the difference between the two weight requirements is determined and divided equally between both sides. Half of the additional compensating weight is placed on one side of the wheel rim and the other half placed on the other side of the wheel rim at points diametrically opposite the point of static imbalance P1.

If the weight Wss needed to compensate for the static imbalance is less than the predetermined run-out weight required, two weights of equal size placed 180° from each other on opposite sides of the wheel can be added to supplement the effect of the static weight placement for dynamic correction.

If the maximum run-out occurs between the approximately 45° and 135° ranges clockwise or counterclockwise of the static imbalance, placement of static weight on either side of the wheel has little affect on the existing couple within the intermediate 45°–135° area.

In case the high run-out point does exist at a position 45° to 135° from the point of static imbalance, the run-out weight Wdd is split into two weights of equal size are added to the wheel; one weight being placed on the side opposite the high point, and the other placed on the same side of the wheel as the high run-out point but 180° from the first weight and the high run-out point.

It is apparent that the method and apparatus of the present invention measures the combined run-out of the wheel and tire assembly relative to the wheel mounting or lug flange 78. It is also to be understood that it is within the scope of the invention to measure the run-out of the wheel rim alone to determine if the wheel, rather than the tire, is warped and is the cause of the wobble or run-out. If lateral run-out is present in both the wheel and the tire, the tire may be repositioned on the wheel to minimize the run-out.

It is also apparent that the apparatus may be used to indicate radial run-out, as opposed to lateral run-out, if desired thereby providing means for indicating to the owner of the tire being balanced that the tire tread is defective and must be trued, not merely balanced. Radial run-out may be taken by repositioning the gauge 106 so that it contacts the tread of the tire, not the side wall, as indicated in phantom lines in FIG. 1.

From the foregoing description it is apparent that in accordance with the method of the present invention a modified vertical axis bubble type static balancer is used for both statically and dynamically balancing a wheel and tire assembly by relying on the amount of lateral run-out or wobble of the combined wheel and tire assembly and by adding predetermined amounts of compensating weights in proportion to the detected amount of maximum linear run-out at specified points on the wheel and tire assembly. In this way the wheel and tire assembly is dynamically balanced within acceptable tolerances without requiring that the assembly be rotated at high speeds. If the amount of weights needed to compensate for static imbalance is greater than that needed for dynamic imbalance, then the additional static weight is split and is added to each side of the wheel rim at points diametrically opposite the point of static imbalance. If on the other hand, the amount of weights necessary to compensate for static imbalance is less than that needed for obtaining dynamic balance additional weights can be added to supplement the dynamic weight effect. Supplementary dynamic weight requires the use of two weights of equal size applied 180° from each other on opposite sides of the wheels.

It is also understood from the foregoing description that the bubble type balancer of the present invention is modified to statically and dynamically balance a wheel and tire assembly by adding a horizontal bearing and a runout gauge to the otherwise conventional balancer thereby enabling the wheel and tire assembly to be slowly spun by hand about a horizontal axis so that the lateral runout or wobble, i.e., the lineal distance between the high spot and the low spot on the side wall of the tire may be determined.

Although the best mode contemplated for carrying out the present invention has been herein shown and described, it will be apparent that modifications and variations may be made without departing from what is regarded to be the subject matter of the invention.

What I claim is:

1. A method of statically and dynamically balancing a wheel and tire assembly having a wheel lug flange and a wheel rim, when supported in a generally horizontal position, with a static bubble balancer having a vertical axis of rotation and a run-out measuring device comprising the steps of: supporting the wheel and tire assembly about a single pivot point coincident with the vertical axis of rotation of the assembly; locating the point of static imbalance by allowing the assembly to pivot out of its horizontal position; repositioning the assembly from support by said single pivot point to planar support of said wheel lug flange in a horizontal reference plane perpendicular to said axis and independent of the plane of the wheel rim; establishing relative rotation between the assembly and the run-out measuring device about said axis; measuring the combined maximum lateral run-out of the wheel and tire assembly as a unit in linear units relative to said reference plane; locating the point of maximum lateral run-out of the assembly radially of the axis; and adding dynamic compensating weights to the wheel assembly in amounts in direct proportion to the combined amount of maximum lateral run-out of the wheel and tire assembly as a unit relative to the wheel lug flange, said compensating weights being added to the wheel assembly in the same radial plane as said point of maximum run-out and at a point diametrically opposite and on the same side of the assembly as the point of maximum run-out if the point of static imbalance lies within 45° from the point of maximum run-out of the assembly, or at a point laterally opposed from and on the opposite side of the assembly from the point of maximum run-out if the point of static imbalance does not lie within 45° but is more than 135° from the point of maximum run-out.

2. A method according to claim 1 wherein the wheel and tire assembly is rotated about said vertical axis relative to the run-out measuring device when the wheel lug flange is supported in the horizontal reference plane.

3. A method according to claim 1 and further including the step of determining the radial run-out of the wheel and tire assembly when the wheel lug flange of the assembly is rotated in the horizontal reference plane for determining if the tire is defective and tire truing is required prior to balancing.

4. A method of statically and dynamically balancing a wheel and tire assembly having a wheel lug flange and a wheel rim, when supported in a generally horizontal position, with a static bubble balancer having a vertical axis of rotation and a run-out measuring device comprising the steps of: supporting the wheel and tire assembly about a single pivot point coincident with the vertical axis of rotation of the assembly; locating the point of static imbalance by allowing the assembly to pivot out of its horizontal position; repositioning the assembly from support by said single pivot point to planar support of said wheel lug flange in a horizontal reference plane perpendicular to said axis and independent of the plane of the wheel rim; establishing relative rotation between the assembly and the runout measuring device about said axis; measuring the combined maximum lateral run-out of the wheel and tire assembly as a unit in linear units relative to said reference plane; locating the point of maximum lateral run-out of the assembly radially of the axis; and adding dymanic compensating weights to the wheel assembly in amounts in direct proportion to the combined amount of maximum lateral run-out of the wheel and tire assembly as a unit relative to the wheel lug flange.

5. An apparatus for statically and dynamically balancing a wheel and tire assembly having a wheel lug flange and a wheel rim comprising: a balancing head symmetrical about a normally vertical axis for engaging and supporting the wheel lug flange and for maintaining the wheel and tire assembly concentric with said axis during balancing, means defining an upper annular horizontal support for supporting said head and wheel lug flange in a horizontal plane during dynamic balancing and being perpendicular to said vertical axis, means defining a pivot fulcrum support coincident with the vertical axis and vertically movable relative to said annular support, annular bearing means between said annular support and said head, a pivot fulcrum between the upper end of said fulcrum support and said head, means for establishing relative vertical movement between said annular support and said fulcrum support for selectively supporting said head either on said fulcrum to determine static imbalance by allowing the assembly to gravitationally pivot out of its normal horizontal position or on said annular bearing for determining run-out of the assembly, and a run-out measuring device contacting a side wall of said wheel and tire assembly when said wheel lug flange is supported in said horizontal plane and being effective to determine the combined run-out of the wheel and of the tire upon establishing relative rotation between said assembly and said device.

6. An apparatus according to claim 5 wherein said annular bearing means comprises a plurality of ball bearings received in an annular groove formed in said annular support and disposed in a horizontal plane, and wherein said fulcrum is a single ball.

7. A wheel balancer for statically and dynamically balancing a wheel and tire assembly including a wheel lug flange and a wheel rim; the balancer being of the type comprising a stand, means for mounting concentric, vertical axis post and sleeve members on said stand, a static balancing head overlying said concentric members, means for supporting the wheel lug flange of a wheel and tire assembly on said balancing head, static balance fulcrum means for said balancing head concentric with said axis, said concentric member mounting means comprising means for causing relative motion between said post and sleeve members for bringing said members into one position wherein said post member supports the balancing head on said static balance fulcrum means and for bringing said members into another position wherein said balancing head is supported on said sleeve member; the improvement comprising bearing means between said balancing head and said sleeve member for accommodating rotation of the balancing head when the latter is in said other position and for confining said rotation to rotation in a horizontal plane about said vertical axis, and means supported by said stand for measuring the combined axial run-out of said wheel and said tire of said wheel and tire assembly as said balancing head is rotated in said other position.

* * * * *